United States Patent Office 2,752,405
Patented June 26, 1956

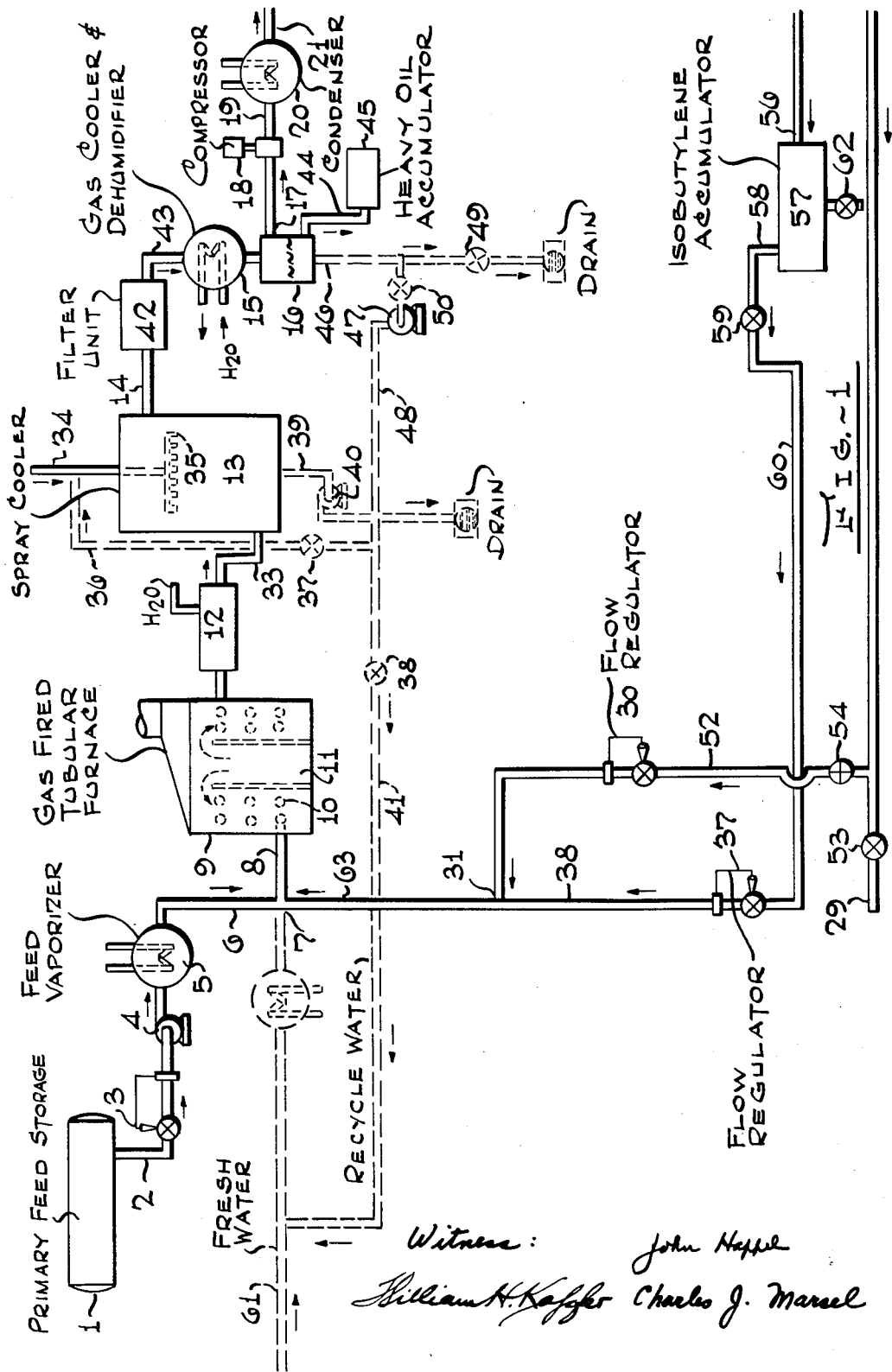

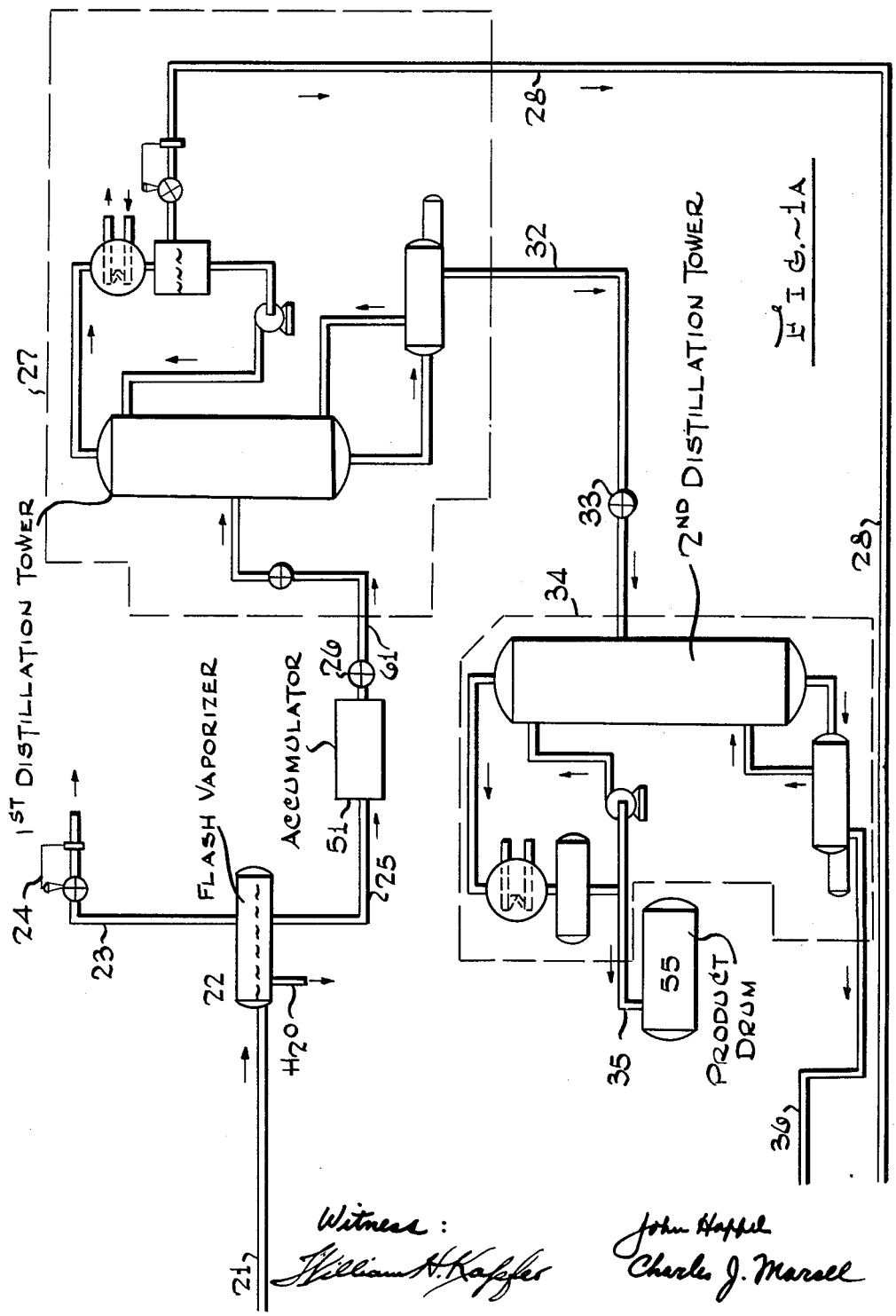

2,752,405

MANUFACTURING PROCESS FOR ACETYLENIC HYDROCARBONS

John Happel, Yonkers, and Charles J. Marsel, New York, N. Y.

Application December 10, 1952, Serial No. 325,106

8 Claims. (Cl. 260—678)

This invention relates to a manufacturing process for the production of acetylenic hydrocarbons, particularly methyl acetylene, together with certain by-products, chiefly allene, by the thermal cracking or pyrolysis of selected feed materials, and more particularly it relates to a new and superior method for making methyl acetylene and by-products by the thermal cracking of tert-butyl alcohol or iso-butylene or mixtures thereof in the presence of steam as a diluent.

Low molecular weight substituted acetylenes and especially methyl acetylene, can be made by the thermal cracking of isomonoolefins or tertiary aliphatic alcohols in the presence of and under conditions of high temperatures and low contact time of the feed. Vacuum conditions are completely avoided in this superior method, since atmospheric or even slightly super-atmospheric pressures are quite satisfactory. There is no coking of the equipment, and consequently no loss of costly feed stock in such useless materials. There is obtained a product having maximum yields of methyl acetylene as well as by-product allene, both of which are highly valuable and useful products.

Pyrolysis contact times of less than 10 seconds and preferably less than 1.0 second, employed in conjunction with a pyrolysis temperature in the range of 850 to 1050° C., are necessary conditions within the reaction zone itself for the best operation of the process. Substantially atmospheric pressures are employed within the cracking zone for best results. Steam is used as the diluent and should be employed admixed with the reactive olefinic feed in mole percent concentrations of more than 50% and preferably in the range of 80 to 90 mole percent. It is preferred to mix the iso-olefin and the steam prior to its entrance into the reaction zone. A preheating of the steam and feed mixture is also used.

Conditions which are especially adaptable for making methyl acetylene are 850–950° C., .001–.01 second contact time and 80–90 mole percent steam. Unconverted feed may be recycled through the reaction zone to insure that it has reacted substantially completely.

It is necessary to cool the cracked gases very quickly to at least 500° C. or lower, after they leave the thermal cracking zone. To accomplish this, a direct water quench is preferably placed immediately after the heating zone. Alternately, the cracked gases may be passed directly from the pyrolysis zone into a stream or spray of cold water or oil, or the exit gases from the pyrolysis zone may be mixed with gases of substantially lower temperature. The substituted acetylene product is separated by condensation of the steam, further compression to knock out additional water, and subsequent pressure distillation to separate methyl acetylene and allene from the reaction products. These steps will be described in further detail in the operating example given below.

An additional and important feature of this process is the pressure distillation of the mixture containing the cracked reaction products. This pressure distillation is carried out in such a way as to provide for a smooth and efficient separation and recovery of the desired acetylenes. Acetylene and carbon dioxide, which are both likely to be present in the cracked reaction product, solidify in the distillation equipment when the mixture is distilled at low temperature and atmospheric pressure. The use of high pressure distillation avoids this difficulty by operating above the so-called "triple point" of these interfering compounds, and thus allowing them to be distilled satisfactorily as liquids. The temperature of the first column is maintained high enough to avoid plugging by solids formation, and yet is not high enough to cause appreciable polymerization of the unsaturated hydrocarbons.

By the use of a number of critical coacting steps, the instant process can be carried out entirely satisfactorily to give good yields of the desired substituted acetylenic products in an economical, efficient, and highly practical manner.

In order to understand the invention more completely, reference is made to the accompanying Figures 1 and 1A, which together are a diagrammatic representation or schematic flow sheet and will serve to illustrate the process when studied in conjunction with the example below:

*Example*

Referring to Figures 1 and 1A the process is carried out in the following manner. The initial raw materials for the process are supplied from the primary feed storage container 1. Flow of the feed is obtained either from the natural pressure of the stock, or from a superimposed gaseous pressure above the liquid or by introduction of a suitable pump 4, into the line 2. Line 2 contains a value or flow controller 3 for regulating the rate of flow of feed to the pyrolysis unit. The feed then proceeds to a vaporizer 5 suitably heated, which converts the liquid feed to vapor and imparts sufficient superheat to the vapor to prevent condensation between the vaporizer and the pyrolysis furnace 9. The superheated feed vapors are conducted through pipe line 6 to the juncture 7 where the superheated steam which acts as diluent is added to the heated feed vapor stream. The stream used as diluent may include fresh water from line 61, and recycle water collected from the spray cooler 13, and gas cooler and dehumidifier 15 to be described below. In addition to the fresh feed and diluent streams, communication is also made at point 7 with the pipe 63 to provide for admitting selected components from the first and second distillation (or separation) units in a manner to be described below.

The mixed feed stock and diluent flow through line 8 to the cracking furnace 9. The feed flows through a helical coil wound in the annular space between the central combustion zone 11 and the furnace walls. The furnace may be oil or gas fired, and provision for use of the lean gases from the flash vaporizer 22, to be described later, may be made. It should be understood that thermocouples necessary to indicate the temperature of the reacting gases at various points in the furnace are to be included in the furnace although not shown in the accompanying diagram. Also the cracking furnace to be employed is not to be limited to the helical coil type herein described but applies to any suitable design for achieving the desired reaction conditions.

The cracked mixture leaves the furnace and enters pipe 33 which has a water cooling jacket 12 to rapidly cool the hot gases as they leave the furnace. (An alternate method consists of spraying water or steam directly into pipe 33 to effect a rapid quench). The partially cooled gases in line 33 then enter the spray cooler 13. The gases are here contacted by a spray of water from line 34, through spray nozzle or sprayer 35, (and recycle water from the gas cooler and dehumidifier 15, if desired) resulting in the rapid cooling of the gases to a temperature at which methyl acetylene and allene are stable. At the same time a portion of the steam used as diluent may be condensed out. The water leaves through line 39 at the bottom of the spray cooler and goes to drain, or may alternatively be pumped by pump 40 through line 41 to be reused as diluent in the pyrolysis process when properly purified.

The cracked gases rise up the spray cooler tower and leave through line 14. This line may contain a filtering unit 42 to remove any remaining tars or carbon before the gaseous products are condensed and purified. The filter unit 42 may preferably consist of a pair of filters, so that one may be cleaned while the other is in use.

The cracked gases leaving the filter, still containing water vapor not condensed in the spray cooler, now pass through pipe 43 to the gas cooler and dehumidifier 15 in which the gases are cooled to a temperature of 100° F. or lower resulting in the condensation of the major portion of the water vapor. Cooling of the gases and condensation of the water are accomplished by conventional water cooling coils using a shell and tube or other usual type of cooler-condenser. The mixture of vapor and condensate then flows to the disengaging drum 16, in which the gases are separated from the water phase. The water layer is removed through line 46 proceeding either to drain through valve 49 or through valve 50 and pump 47 to be used either as diluent or as cooling water for the spray cooler 13.

Together with the condensed water, heavy oils including those of aromatic nature which may have formed in the pyrolysis reaction are condensed at this point. These may be skimmed from the top of the water layer, caused to flow through line 44 and collected in the heavy oil accumulator 45.

The vapors leaving the disengaging drum through line 17 then enter the compressor 18 in which the pressure of the gas is raised to a degree sufficient to permit partial condensation of the vapors after they have been subsequently cooled in the vapor condenser 20. Separation of the liquid and vapor streams takes place in the flash vaporizer drum 22. By this process of compression, condensation and flash vaporization, a liquid stream richer in higher boiling components and a vapor stream richer in the lighter components are produced. The lean gases leaving the flash vaporizer 22 flow through line 23, the rate of flow being controlled by a back pressure regulator 24. The lean gases may be used as fuel for the pyrolysis furnace if desired.

The liquid product from the flash vaporizer 22 flows through line 25 to accumulator 51.

The liquid product in the accumulator 51 now contains the desired methyl acetylene plus lighter and heavier components, the composition of the mixture being dependent on the composition of the total feed to the cracking furnace, and the operating temperature and residence time of the gases in the furnace. The lighter components consist of allene and other $C_3$, $C_2$ and $C_1$ hydrocarbons plus a small quantity of hydrogen. The fraction heavier than methyl acetylene consists chiefly of isobutylene with a small quantity of heavier polymeric constituents.

Separation and purification of the methyl acetylene from this mixture is carried out in the present process by a two stage pressure distillation process. The first distillation unit 27 takes feed from the accumulator 51 through valve 26 and line 61. Since the distillation equipment is conventional and is generally known to the art, no detailed description will be indicated here. However, the use of pressure in the first distillation unit avoids plugging of the column, which is caused by the formation of solid acetylene or solid carbon dioxide. The first unit 27 produces an overhead cut in the form of a vapor consisting essentially of the components of the feed mixture lighter boiling than methyl acetylene. This stream leaves the first distillation unit through line 28. This stream may be either taken off as product, to be further processed as desired, by closing valve 54 and opening valve 53 permitting the gas to flow through line 29, or the stream may be recycled to the pyrolysis furnace by permitting flow through valve 54, thence through lines 52 and 63 to juncture 7. It is apparent that any desired proportion of this stream may be recirculated and the rest withdrawn by utilization of the flow controller 30 in line 52.

The bottoms product from the first distillation unit consists essentially of methyl acetylene, isobutylene and a small quantity of heavier material. This stream leaves through line 32 and proceeds through a second distillation unit 34 in which it is utilized as the feed stream to the distillation tower. Alternately, the bottoms product from distillation unit 1 may flow through line 32 to an accumulator (not shown in the diagram) and then be propelled into the second unit at any desired rate by means of a pump.

In the second distillation unit 34, the process stream is separated into essentially pure methyl acetylene which emerges from the unit as overhead liquid in line 35. It then flows into product drum 55.

The bottoms product from distillation unit No. 2, 34, containing essentially isobutylene and a small quantity of higher boiling materials including polymerized materials formed during the distillation process is conducted through line 36 to the isobutylene accumulator 57, which it enters at point 56. The isobutylene may be removed as a liquid product by opening valve 62 provided the isobutylene is maintained under the accumulator operating pressure of approximately 100 p. s. i. g. If the isobutylene is to be used as a recirculation stream, it is taken off at point 58 of the accumulator, and flashed to a vapor by reducing its pressure by means of valve 59. The vaporized isobutylene then flows through line 60 to flow controller 37 and thence through line 38 to juncture with the fresh feed and diluent streams at point 7. If at the same time a portion of the overhead stream from the first distillation is being recirculated, this stream will meet the isobutylene stream at point 31 and both will be mixed and proceed through line 63 to the point of juncture of the fresh feed and diluent streams at 7.

What is claimed is:

1. An improved process for the manufacture of acetylenic hydrocarbons which comprises the steps of passing a feed selected from the group consisting of tertiary-butyl alcohol and isobutylene and mixtures thereof to a vaporizing zone wherein the liquid feed is converted to vapor, admixing said vaporized feed with at least 50 mole per cent of steam, passing said mixture of vaporized feed and steam to a pyrolysis zone wherein a controlled cracking temperature of 850 to 1050° C. is maintained, holding said mixture within the pyrolysis zone for a period of less than 10 seconds, immediately thereafter passing the hot, cracked gases to a quenching zone wherein said gases are cooled to at least 500° C., thereafter separating said cooled, cracked gases containing the acetylenic products from solid contaminants, passing said cracked gases to a cooling and dehumidifying zone wherein a substantial portion of water vapor is condensed and removed, concentrating the cracked gas stream to give a stream richer in acetylenic hydrocarbon components than the initial cracked pyrolysis gases, passing said concentrated gas stream to at least one pressure distillation zone from which a fraction rich in methylacetylene is removed as a product stream.

2. An improved process such as that described in claim 1 in which the feed is tertiary-butyl alcohol.

3. An improved process such as that described in claim 1 in which the feed is isobutylene.

4. An improved process for the manufacture of methylacetylene which comprises the steps of continuously passing a feed selected from the group consisting of tertiary-butyl alcohol and isobutylene and mixtures thereof to a vaporizing zone wherein the liquid feed is converted to vapor, admixing said vaporized feed with from 80 to 90 mole per cent of steam, thereafter passing said mixture of vaporized feed and steam to a pyrolysis zone wherein a controlled cracking temperature of 850 to 950° C. is maintained, holding said mixture within the pyrolysis zone for a controlled period of .001 to .01 seconds, immediately thereafter passing the hot cracked gases to a water cooled quenching zone wherein said gases are cooled to at least 500° C., thereafter separating said cooled, cracked gases containing methylacetylene from solid contaminants, passing said cracked gases to a cooling and dehumidifying zone wherein a substantial portion of water vapor is condensed and removed, concentrating the methylacetylene in a less volatile, liquid stream, subjecting said concentrated methylacetylene stream to at least one pressure distillation from which a purified methylacetylene stream is removed as a product stream.

5. An improved process for the preparation of methylacetylene and allene which comprises the steps of continuously passing a feed selected from the group consisting of tertiary-butyl alcohol and isobutylene and mixtures thereof to a vaporizer wherein the feed is converted to a vapor, admixing said vaporized feed with from 80 to 90 mole per cent of steam, passing said mixture of vaporized feed and steam to a cracking furnace wherein a controlled temperature of 850 to 950° C. is maintained, holding the feed mixture within said furnace for a controlled contact period of .001 to .01 seconds, passing the hot cracked gases immediately to a spray cooler in which said gases are contacted with a water spray whereby the temperature of said gases is reduced to below 500° C., passing said cooled gases through a filter to remove solid contaminants, thereafter subjecting the gases to compression, condensation, and flash vaporization whereby a liquid stream enriched in methylacetylene is obtained, passing said methylacetylene rich stream to an initial pressure distillation zone, from which a bottoms stream containing methylacetylene and an overhead stream containing lighter components are obtained, passing said bottoms stream into an intermediate position of a secondary pressure distillation zone, from which an overhead stream of substantially pure methylacetylene and a bottoms stream containing substantial quantities of unreacted feed are obtained.

6. An improved process such as that described in claim 5 in which the feed is tertiary-butyl alcohol.

7. An improved process such as that described in claim 5 in which the feed is isobutylene.

8. An improved process such as that described in claim 5 in which at least a portion of the overhead stream from the initial distillation zone and at least a portion of the bottoms stream from the secondary distillation zone are recycled to the cracking furnace.

References Cited in the file of this patent

UNITED STATES PATENTS

| | | |
|---|---|---|
| 1,282,906 | Mersereau | Oct. 29, 1918 |
| 1,942,131 | Baumann et al. | Jan. 2, 1934 |
| 1,999,397 | Chilton | Apr. 30, 1935 |
| 2,313,022 | Rottmayr | Mar. 2, 1943 |
| 2,322,122 | Frolich et al. | June 15, 1943 |
| 2,402,277 | Frey | June 18, 1946 |
| 2,429,566 | Rice | Oct. 21, 1947 |
| 2,649,485 | Taylor et al. | Aug. 18, 1953 |